United States Patent Office 3,784,536
Patented Jan. 8, 1974

3,784,536
PROCESS FOR REDUCING THE NUCLEIC ACID CONTENT OF SINGLE CELL PROTEIN AFFORDING MICROORGANISMS
Cavit Akin, Oakbrook, and Kwei C. Chao, Homewood, Ill., assignors to Standard Oil Company, Chicago, Ill.
No Drawing. Filed Feb. 4, 1971, Ser. No. 112,779
Int. Cl. A23j 1/00, 1/18
U.S. Cl. 260—112
10 Claims

ABSTRACT OF THE DISCLOSURE

The nucleic acid content of single-cell protein (SCP) materials is reduced to a level acceptable in food products by treatment of the whole cells with aqueous ethanolic mineral acid at elevated temperatures within the range from 60° to 125° C. Removal of nucleic acids without substantial removal of protein material is accomplished by limiting the treating time to about 5 to 30 minutes.

BACKGROUND OF THE INVENTION

Recent concern for the welfare of the world population has included consideration of additional means for feeding the rapidly increasing number of people involved. The problem embraces providing both adequate per capital caloric intake and a balanced diet, with particular reference to the acknowledged lack of sufficient protein-affording foods in many parts of the world. One means for providing necessary protein supplies is through the growth of single-cell protein-affording microorganisms, such as yeasts, bacteria and algae, for use as either foods or food supplements.

Production of single-cell protein (SCP) materials in large quantity may be accomplished by fermentation processes employing, for example, carbohydrate, hydrocarbon or oxygenated hydrocarbon materials as substrate. Principal requirements are that the substrate material be inexpensive and readily consumed by the selected microorganism so that process costs are not excessive. Equally important is the acceptability and utility of the SCP material as a food or food component. These latter considerations include taste and odor factors relating to public acceptance as well as metabolic and toxicity factors relating to suitability of SCP material for inclusion in the human diet.

Both the technical and the patent literature describe fermentation processes for production of microorganisms which readily afford useful SCP materials. For example, yeasts have been grown on the carbohydrates contained in waste sulfite liquor, the normal alkane components of a gas oil hydrocarbon fuel, and on a mixture of oxygenated hydrocarbons. Production of bacteria has been similarly described. Fermentation to produce yeasts or bacteria comprises an oxidation process, evolving much heat and requiring both substantial oxygen transfer and good control of fermentation temperature. Preferred substrate materials will already contain as much combined oxygen as possible in order to minimize the heat release and the oxygen requirement. Production of food-grade SCP material may also require an extraction step to limit the presence of undesirable, residual substrate material such as high-molecular-weight hydrocarbons or slowly fermented oxygenated hydrocarbon species.

A number o fthe fermentation processes planned or in use currently for production of SCP material are intended to provide primarily an animal feed supplement and hence to supply protein for human consumption only indirectly. However, some microorganisms, notably certain yeasts within the Saccharomycetoideae and Cryptococcoideae sub-families, have been approved by the Food and Drug Administration for direct use in foods intended for human consumption.

The human metabolic system produces uric acid as in the metabolism of ribonucleic acid (RNA). Since man does not have a uricase enzyme system, uric acid is not further broken down and is excreted with urine. Because uric acid has a very low solubility in water it will accumulate in the body in crystalline form if produced in larger quantities than the body can excrete. This may lead to the condition known as gout. It is, therefore, recommended by many nutritionists that the RNA intake in diet be kept at a low level.

Microbial cells, or single-cell protein (SCP) materials, contain from 4% to 30% or more nucleic acids according to their growth rates and the phase of growth. Usually the higher nucleic acid contents of the microbial cells are associated with rapid growth phases. If the microbial cells are to be used as a protein source in human feeding, nutritionists recommend generally that the amount of nucleic acids contributed by SCP to diet should not exceed 2 grams per day.

The calculated RNA contents of some conventional protein sources are given in Table I. These vary from 0 to 4 percent. The RNA content of SCP generally ranges from 8 to 18 percent for exponential growth phase cells. In SCP intended for human consumption the RNA content should preferably be reduced to about 2% on cell dry weight basis.

TABLE I.—RNA CONTENT (CALCULATED) OF VARIOUS PROTEIN SOURCES

| Food: | Percent RNA |
|---|---|
| Milk | 0 |
| Beans | 1.7 |
| Salmon | 2.4 |
| Chicken | 2.9 |
| Beef | 3.7 |
| Pork | 4.1 |
| Liver | 9.3 |
| Anchovies | 14.5 |
| SCP | 8–18 |

A preferred way of utilizing SCP material is in the form of whole cells. Accordingly there is a need for the development of means for removing nucleic acids from within the microbial cells. This is desirably accomplished with a minimum loss of protein materials from within the cells in order to maintain the nutritional attractiveness of such SCP materials.

SUMMARY OF THE INVENTION

The object of this invention is to provide novel high-quality food products and food components, comprising cellular SCP materials having a nucleic acid content that has been decreased to a level generally accepted in food materials intended for human consumption.

This invention provides a novel and improved process for removal of nucleic acids from whole-cell SCP materials. This invention further provides novel treated cellular SCP materials having a high protein content coupled with a generally accepted suitably low content of nucleic acids.

The process of this invention reduces the nucleic acid content of whole-cell SCP materials to less than about 2 wt. percent by suspending the cells in an aqueous ethanolic mineral acid medium maintained at a temperature within the range from about 60° to about 125° C. The treating time at the selected temperature is kept within the limits of from about 5 to about 30 minutes. These treating conditions achieve the desired removal of nucleic acids without excessive chemical attack upon either the cell walls or the protein materials contained within the cells. Water washing of the treated cellular SCP materials provides a food product or food component suitable for human consumption and having a high content of proteins required for good nutrition.

DESCRIPTION OF THE INVENTION

This invention discloses a novel method for reducing the nucleic acid content of unicellular microorganisms together with the novel and improved food products obtained thereby.

It has been found that most of the nucleic acid content of single-cell microorganisms can be removed by treatment with aqueous alcoholic mineral acid solution. The suitable temperature range has been found to extend from about 60° C. up to about 125° C. for times ranging from about 5 to about 30 minutes. Although the loss of nucleic acids from within the single-cell organisms is apparently due to the hydrolytic effect of the treating medium, it was surprisingly noted that the protein material contained within the cells was not affected to the same degree. It has thus been possible, by application of this inventive process, to obtain single-cell protein material in the form of intact cells and having a nucleic acid content substantially below 2 wt. percent.

The practice of this invention is broadly applicable to microorganisms and particularly to those organisms classified as bacteria, yeast and fungi. By way of illustration bacteria such as those listed in Table II, yeast such as those listed in Table III and fungi such as those listed in Table IV are suitable microorganisms.

TABLE II.—SUITABLE BACTERIA

| | |
|---|---|
| Acetobacter sp. | Corynebacteria sp. |
| Arthrobacter sp. | Micrococcus sp. |
| Bacillus subtilus | Pseudomonas sp. |

TABLE III.—SUITABLE YEASTS

| | |
|---|---|
| Candida curvata | Saccharomyces fragilis |
| Candida lipolytica | Trichosporon cutaneum |
| Candida pulcherima | Saccharomyces cerevisiae |
| Candida utilis | Candida parapsilosis |
| Hansenula anomala | Hansenula wickerhamii |
| Hansenula miso | Pichia pastoris |
| Oidium lactis | Pichia haplophyla |
| Saccharomyces carlsbergensis | |

TABLE IV.—SUITABLE FUNGI

| | |
|---|---|
| Asyergillus niger | Pencillium notatum |
| Aspergillus glaucus | Penicillium chrysogenum |
| Aspergillus oryzae | Penicillium glaucum |
| Aspergillus terreus | Penicillium griseofulvum |
| Aspergillus itaconicus | |

*Candida utilis*, *Saccharomyces cerevisiae*, *Saccharomyces fragilis*, and *Saccharomyces carlsbergensis* are preferred starting materials for the process of this invention, however, because each has been approved by the F.D.A. for use in food products.

This invention may be applied to either isolated cellular material or to cells newly grown in a fermentation process. Where the cellular material has been previously isolated it should be slurried with water to provide the desired cell concentration. Where fresh cells are employed the fermentor effluent may be concentrated, as by centrifugation, to provide a suitable slurry.

The concentration of cellular SCP material suspended in the aqueous alcoholic mineral acid solution may vary within the range from 2 to 20 wt. percent (dry basis) and is preferably held within the range from 5 to 12 wt. percent (dry basis) cells.

The mineral acid to be employed in the process of this invention may be selected from hydrochloric, phosphoric and sulfuric acids although hydrochloric acid is preferred. The molarity of the acid in the aqueous alcoholic solution may vary from about 0.3 molar to about 1.0 molar. Treatment at lower temperatures is preferably conducted with approximately 1.0 molar acid solutions while treatment at higher temperatures is most preferably effected at about 0.5 molarity of mineral acid.

Although any lower alkanol completely miscible with the aqueous mineral acid may be employed, ethanol is preferred because its use presents no toxicity problems requiring its complete removal from the treated SCP material.

The surprising removal of nucleic acids coupled with relatively little attack on the protein material contained in the cellular microorganisms may be effected at temperatures ranging from about 60° C. up to about 125° C. When a relatively low temperature; e.g., 60° C., is selected the acidic aqueous ethanolic medium should contain from 40 to 60 vol. percent ethanol, preferably 50 vol. percent ethanol, together with sufficient mineral acid to provide a molarity of about 1.0. A convenient temperature for treatment is the steam point, or 100° C., where a 50 vol. percent ethanolic solution is still preferred but with the acid molarity reduced to about 0.5. When elevated pressure is employed and a temperature in the range from 115° to 125° C. is achieved, the acid molarity may vary from about 0.3 to about 1.0 while the ethanol concentration in the medium is held within the concentration limits of 5 to 20 vol. percent. At about 120° C., preferably a 10 vol. percent ethanolic solution is employed which is about 0.5 molar in hydrochloric acid.

The treating time may vary from about 5 to 30 minutes with the shorter time periods being generally associated with the higher treating temperatures. When operating the process at about 60° C. the treating time is preferably about 30 minutes although this period decreases to about 10 minutes at treating temperatures ranging from about 100° C. upward to about 120° C.

After the treating period is concluded the cells are separated from the aqueous phase, preferably by centrifuging. The treated cells may then be washed with water in the centrifuge or may be washed in a separate slurrying operation followed by an additional separation step, as by centrifugation. The washed cells are then dried by conventional techniques with care being taken not to expose them to extremely high temperatures. It is preferred, for example, to dry the cells by heating at a temperature of about 70° C. If desired, vacuum drying or spray drying may be employed.

The process of this invention is both rapid and reliable. The recovered cell material consistently contains less than 2 percent (dry basis) nucleic acids. The protein content of the treated cells is usually within the range from 45 to about 80 wt. percent (dry basis) which corresponds substantially with the protein content of the original cells. Desirable physical properties, including taste and odor, are not harmed by the process of this invention and the resulting SCP food material has been substantially improved in its nutritional characteristics. Surprisingly, the functional properties; i.e., texturizing characteristics, water and oil retention, low dispersibility in water, and the like are greatly improved. Accordingly, the SCP food materials of this invention possess great versatility relative to incorporation in conventional food products and to development of new food products.

SPECIFIC EMBODIMENTS OF THE INVENTION

The following examples are illustrative, without implied limitation, of our invention.

Example I

Spray-dried Torula yeast was treated with aqueous mineral acids over a broad range of molarities as shown in Table V. In all experiments the Torula yeast was treated as a 5 wt. percent suspension in the selected aqueous acidic medium for 30 minutes at 100° C. The treated cells were then washed twice with sufficient distilled water to provide a 5 wt. percent suspension in order to remove substantially all mineral acid anions. The cells were then dried and analyzed for RNA and protein contents. While the RNA was reduced to a satisfactory concentration level, there was consistently an extreme diminution in the protein content of the treated cells such that the nutritive value of the treated cells became unattractive.

Example II

A series of treatments were conducted on commercial spray-dried Torula yeast employing both aqueous hydrochloric acid and aqueous ethanolic hydrochloric acid as shown in Table VI. Cell concentration level and the recovery techniques were as described in Example I. At the low treating temperature of 60° C. only a 50 vol. percent ethanolic solution, 1.0 molar in hydrochloric acid, reduced the RNA content to a suitable level.

TABLE V.—REDUCTION OF RNA CONTENT OF SCP

| Extractant | Concentration, M | SCP analysis, wt. percent | |
|---|---|---|---|
| | | RNA | Protein |
| None | | 8.3 | 56.0 |
| Distilled water | | 3.73 | 32.4 |
| $H_2SO_4$ | 2 | 0.543 | |
| | 1 | 0.67 | 30.0 |
| | 0.5 | 1.12 | 51.0 |
| | 0.25 | 2.54 | |
| $H_3PO_4$ | 2 | 1.03 | 35.6 |
| | 1 | 0.60 | 28.2 |
| | 0.33 | 1.27 | 30.0 |
| HCl | 2 | 0.467 | 19.2 |
| | 0.5 | 0.392 | 25.2 |

TABLE VI.—REDUCTION OF RNA CONTENT OF SCP WITH HCl

| Extractant medium | Molarity | Time, min. | Temp., °C. | RNA, wt. percent |
|---|---|---|---|---|
| Water | 0.5 | 30 | 100 | 0.486 |
| Do | 0.5 | 10 | 100 | 0.565 |
| Do | 0.5 | 30 | 68 | 2.82 |
| Do | 0.5 | 30 | 25 | 6.51 |
| Do | | 30 | 60 | 3.44 |
| Ethanol | | 30 | 60 | 4.67 |
| 50% water-50%ethanol | 1.0 | 30 | 60 | 0.845 |
| | 0.5 | 30 | 60 | 4.1 |
| 25% water-75% ethanol | 0.5 | 30 | 60 | 4.21 |

Example III

Table VII summarizes results obtained by treating spray-dried Torula yeast at a 9 wt. percent cell concentration in various media at 121° C. (14.7 p.s.i.g.), for 10 minutes, followed by washing the treated cells twice with sufficient distilled water to provide a 9 wt. percent cell concentration. The treated cells were then dried and analyzed. Most surprisingly, the use of 10 vol. percent ethanol in water as a medium for 0.5 molar hydrochloric acid reduced the RNA content of the dried treated cells to below 2 wt. percent while preserving the protein content substantially intact.

Example IV

Samples of both commercial spray-dried Torula yeast and a freshly grown Torula yeast (*Candida utilis*) were treated for 30 minutes with distilled water at 100° C. and identical samples with 50 vol. percent ethanol in water, 1.0 molar in hydrochloric acid, at 60° C. Cell concentration level and the recovery techniques were as described in Example I. No difference in treating results, based on the source and history of the treated cells, was evident. With both yeast materials, the aqueous ethanolic hydrochloric acid treatment successfully reduced the RNA content in the treated cells to an acceptable level.

TABLE VII.—RNA REMOVAL AT HIGH TEMPERATURE
[(121° C.; 10 minutes)]

| Extractant medium | HCl molarity | SCP analysis, wt. percent | |
|---|---|---|---|
| | | RNA | Protein |
| Water | | 10.4 | 54 |
| 30% water-70% ethanol | | 13.3 | 49 |
| Water | 0.5 | 5.25 | |
| Ethanol | 0.5 | 2.7 | 79 |
| 90% water-10% ethanol | 0.5 | 1.5 | 79 |
| Do | 0.5 | 1.8 | 84 |

TABLE VIII.—EFFECT OF CELL HISTORY ON RNA REDUCTION

| Extractant medium | HCl molarity | Time, min. | Temp., °C. | RNA, wt. percent |
|---|---|---|---|---|
| Spray-dried Torula: | | | | |
| None | | | | 8.3 |
| Distilled water | | 30 | 100 | 3.73 |
| 50% water-50% ethanol | 1.0 | 30 | 60 | 0.845 |
| Fresh Torula: | | | | |
| None | | | | 8.51 |
| Distilled water | | 30 | 100 | 7.29 |
| 50% water-50% ethanol | 1.0 | 30 | 60 | 0.444 |

We claim:

1. A process for substantially reducing the nucleic acid content of single-cell protein-affording microorganisms intended for use in food products, comprising the steps of:
    (a) suspending intact microorganism cells in an aqueous ethanolic mineral acid solution, said mineral acid being selected from the class consisting of hydrochloric, phosphoric and sulfuric acids, and said aqueous ethanolic mineral acid solution containing from 5 to 60 vol. percent ethanol and having a mineral acid molarity in the range from about 0.3 to about 1.0;
    (b) maintaining said microorganism cells in said suspension at a temperature in the range from about 60° to about 125° C. for a time within the range from about 5 to about 30 minutes;
    (c) separating said microorganism cells from said aqueous ethanolic mineral acid solution; and
    (d) washing said separated cells with water.

2. The process of claim 1 wherein the separated cells are washed with water until the mineral acid anion content has been substantially removed.

3. The process of claim 1 wherein the suspension comprises from about 5 to about 12 wt. percent intact microorganism cells in aqueous ethanolic hydrochloric acid.

4. The process of claim 3 wherein the intact microorganism cells are suspended in a solution comprising from about 0.3 to about 1.0 molar hydrochloric acid in aqueous ethanol, containing from 40 to 60 vol. percent ethanol, and said suspension is maintained at a temperature in the range from about 60° to about 100° C. for from about 5 to about 30 minutes.

5. The process of claim 4 wherein the solution is about 0.5 molar in hydrochloric acid and contains about 50 vol. percent ethanol, and the suspension is maintained at about 100° C. for about 10 minutes.

6. The process of claim 3 wherein the intact microorganism cells are suspended in a solution comprising from about 0.3 to about 1.0 molar hydrochloric acid in aqueous ethanol, containing from 5 to 20 vol. percent ethanol, and said suspension is maintained at a temperature in the range from about 115° to about 125° C. for from about 5 to 15 minutes.

7. The process of claim 6 wherein the solution is about 0.5 molar in hydrochloric acid and contains about 10 vol. percent ethanol, and the suspension is maintained at about 120° C. for about 10 minutes.

8. The process of claim 1 wherein the microorganism is selected from the class consisting of bacteira and yeasts.

9. The process of claim 8 wherein the microorganism is a yeast selected from the class consisting of *Saccharo-*

*myces cerevisiae, Saccharomyces carlsbergensis, Saccharomyces fragilis* and *Candida utilis*.

10. The process of claim 9 wherein the yeast is *Candida utilis*.

References Cited

UNITED STATES PATENTS

| | | | |
|---|---|---|---|
| 3,615,654 | 10/1971 | Ayukawa et al. | 99—14 |
| 3,634,194 | 1/1972 | Frankisnfeld et al. | 195—28 N |
| 3,139,385 | 6/1964 | Qgata et al. | 195—28 N |
| 3,163,638 | 12/1964 | Miwa et al. | 195—28 N |
| 3,686,144 | 8/1972 | Tamura et al. | 99—14 |

ALVIN E. TANENHOLTZ, Primary Examiner

U.S. Cl. X.R.

426—364

PO-1050
(5/69)

UNITED STATES PATENT OFFICE
CERTIFICATE OF CORRECTION

Patent No. 3,784,536                                  Dated January 8, 1974

Inventor(s)  Cavit Akin and Kwei C. Chao

It is certified that error appears in the above-identified patent and that said Letters Patent are hereby corrected as shown below:

Column 1, line 25, "capital" should be -- capita --;
" 65, "o fthe" should be -- of the --.

Column 3, line 48, "Asyergillus" should be -- Aspergillus --;

Column 5, line 43, "50%ethanol" should be -- 50% ethanol --;
" 45, "75% wthanol" should be -- 75% ethanol --.

Column 6, line
" 67, The word "about" should appear before "15 minutes";
" 73, "bacteira" should be -- bacteria --.

Signed and sealed this 29th day of April 1975.

(SEAL)
Attest:

RUTH C. MASON
Attesting Officer

C. MARSHALL DANN
Commissioner of Patents
and Trademarks